United States Patent
Robinson et al.

[15] 3,686,364

[45] Aug. 22, 1972

[54] IMPERMEABLE POLYMERIC COMPOSITIONS

[72] Inventors: Keith J. Robinson; Heinz A. Pfisterer, both of Sarnia, Ontario, Canada

[73] Assignee: Polymer Corporation Limited, Sarnia, Ontario, Canada

[22] Filed: Dec. 11, 1969

[21] Appl. No.: 884,365

[30] Foreign Application Priority Data

Jan. 28, 1969 Canada......................041,284

[52] U.S. Cl..................260/876 B, 424/33, 215/38, 215/47
[51] Int. Cl............................C08f 29/12, C08f 33/08
[58] Field of Search................................260/876 B

[56] References Cited

UNITED STATES PATENTS

| | | |
|---|---|---|
| 3,239,478 | 3/1966 | Harlan....................260/876 B |
| 3,265,765 | 8/1966 | Holden et al...........260/876 B |
| 3,293,197 | 12/1966 | Vincent et al..........260/876 B |
| 3,445,543 | 5/1969 | Gruver...................260/876 B |
| 3,534,965 | 10/1970 | Harrison et al.........260/876 B |

*Primary Examiner*—Samuel H. Blech
*Attorney*—Stevens, Davis, Miller & Mosher

[57] ABSTRACT

A mouldable blend of a thermoplastic elastomeric block copolymer, an elastomeric isobutylene polymer and optionally, a resinous polymer of monoalkenyl aromatic hydrocarbon is used in the manufacture of moulded soft rubber goods, e.g., pharmaceutical enclosures.

10 Claims, No Drawings

IMPERMEABLE POLYMERIC COMPOSITIONS

This invention relates to polymeric compositions. More particularly, it relates to elastomeric thermoplastic polymer compositions of improved air impermeability.

Polymers exhibiting the properties of both a thermoplastic and an elastomer are known. These polymers comprise block copolymers having two terminal polymeric blocks of a thermoplastic polymer, for example polystyrene or polyalphamethylstyrene, and at least one non-terminal block of an elastomeric polymer, for example polybutadiene or polyisoprene. Typical examples of such block copolymers are those of general form polystyrene-polybutadiene-polystyrene and polyalphamethyl-styrene-polybutadiene-polyalphamethylstyrene. These block copolymers exhibit the properties of elastomers, i.e., elongation at break of greater than 100 percent and rapid retraction to approximately their original length after removal of the elongating stress, without curing. They are also thermoplastic, so that they can be molded by conventional molding techniques. They resume their elastomeric properties on cooling and solidifying.

It has now been found that air impermeability of these thermoplastic elastomers can be enhanced by blending therewith an isobutylene polymer, for example butyl rubber (a copolymer of isobutylene with small amounts of isoprene). This improvement in air impermeability makes the thermoplastic elastomers highly suitable for use in a new range of applications.

Accordingly, the present invention provides a polymeric composition comprising 100 parts by weight of a thermoplastic elastomeric block copolymer and from about 5 to about 250 parts by weight of an isobutylene polymer.

The preferred block copolymers for use in the present invention are those in which the thermoplastic terminal blocks are of polyalphamethylstyrene or polystyrene, and the elastomeric non-terminal block is a polymer of a conjugated diolefinic hydrocarbon. Block copolymers of general form polyalphamethyl-styrene-polybutadiene-polyalphamethylstyrene are especially preferred, on account of their superior high temperature physical properties.

The most suitable isobutylene polymers include solid polyisobutylene and butyl rubber, with butyl rubber being the most preferred polymer. Butyl rubber is a high molecular weight copolymer of isobutylene with less than 20 percent, preferably less than 5 percent of one or more $C_4 - C_{14}$ diolefins such as isoprene, divinylbenzene, pentadiene-1,4. The isobutylene polymers which are used in this invention are solid plastic-deformable materials which do not exhibit the properties of an elastomer unless vulcanized.

Methods of preparation of the suitable block copolymers are well known per se, and do not comprise a part of the present invention. Briefly, they involve polymerization of the first, thermoplastic forming monomer by means of an anionic polymerization, initiator such as butyl lithium and after complete polymerization, addition of a charge of monomer to form the elastomeric block to the non-deactivated polymerization reaction mixture. After complete polymerization of the second monomer, a further monomeric charge is added to the non-deactivated polymer, to form a three-block copolymer. Such polymerization of alphamethylstyrene is best carried out at low temperatures and in the presence of small amounts of a polar solvent.

Similarly, the preparation of the isobutylene polymer is well known per se, and does not comprise part of the present invention. Such preparation involves cationic polymerization of the monomers at low temperatures.

The method of blending the block copolymer and the isobutylene polymer is preferably by mill mixing at elevated temperatures or by mixing in internal mixers. The method, however, is not critical, provided that an intimate dispersion of the two polymers is achieved. Other methods, such as solution blending, may also be employed.

As compared with the block copolymer alone, the blends of the present invention show greatly enhanced air impermeability, as previously mentioned, along with increased softness and decreased modulus of extension. The other physical properties of the block copolymers are largely retained. While these properties make the blends ideally suitable for some applications, such as pharmaceutical enclosures, as discussed below, it is in some cases desirable to have thermoplastic elastomeric compositions with good air impermeability, along with increased tear strength and a hardness similar to that of the raw block copolymer. To achieve this, minor amounts of a polymer of a monoalkenyl substituted aromatic hydrocarbon, such as polystyrene, may be added to the block copolymer-isobutylene polymer blends.

Thus according to a further aspect of the invention, there is provided a polymeric composition comprising 100 parts by weight of a thermoplastic elastomeric block copolymer, from about 5 to about 250 parts by weight of an isobutylene polymer, and up to about 50 parts by weight of a polymer of a monoalkenyl substituted aromatic hydrocarbon. Preferred among such three-component polymer blends are blends of 100 parts by weight of a block copolymer of general form polyalphamethylstyrene-polybutadiene-polyalphamethylstyrene, from about 10 to about 60 parts by weight of butyl rubber and from about 10 to about 20 parts by weight of polystyrene. These three-component blends additionally have improved tear strength and are well suited for preparation of molded or calendered shoe soles.

The two-component blends of the present invention, especially blends of polyalphamethylstyrene-polybutadiene-polyalphamethylstyrene block copolymers and butyl rubber, are particularly suitable for the manufacture of caps, stoppers and the like enclosures for sealing containers for pharmaceutical preparations. They have a high degree of impermeability to air, thus protecting the pharmaceutical preparations in the container from the possible harmful effects of contact with air. In addition, the two-component compositions of the present invention are self-sealing, i.e., they can be pierced with a syringe needle having a diameter of about one-fifteenth of an inch or less and after withdrawal of the needle, the composition closes up and seals again.

The self-sealing property is associated with the correct degree of softness and elasticity of the polymeric compositions, so that passage of the syringe needle therethrough does not lead to removal or permanent displacement of any of the composition contacted by the needle during its passage. At the same time, these compositions are thermoplastic and moldable so that enclosures of the desired shape can be readily formed from them by well-known molding techniques, in contrast with conventional rubbers. After molding, they will withstand sterilization temperatures of up to about 110° C and procedures to which pharmaceutical enclosures must be subjected. Also of importance, the compositions acquire the above desirable properties for this use without the necessity of compounding or curing them, so that the risk of having residual biologically active ingredients in the polymeric compositions, left over from the curing process, a danger which is always present with conventional rubbers, is avoided. The compositions may contain small amounts of suitable inert pigments for decorative purposes, or for purposes of identifying various grades of compositions.

The invention will be further described with respect to specific examples.

EXAMPLE 1

A block copolymer of general form polyalphamethyl-styrene-polybutadiene-polyalphamethylstyrene (hereinafter referred to as $\alpha B\alpha$ block copolymer) was prepared, blended with different quantities of uncured butyl rubber, and the physical properties of the resultant polymeric blends tested.

The $\alpha B\alpha$ block copolymer had an alphamethylstyrene content of approximately 35 weight percent and a molecular weight of about 60,000. It was prepared by the stepwise addition, anionic polymerization method outlined previously.

Three separate blends were prepared, using 30, 40 and 50 parts by weight of butyl rubber respectively with 100 parts by weight of $\alpha B\alpha$. The blending was carried out on a micro mill, the mill rolls of which were at elevated temperatures in the range of about 130° C to about 150° C. The resulting blends were compression molded for 2 minutes at 140° C to prepare micro samples for physical testing. The preparation and testing of micro samples is as described in "Rubber World," January, 1961, page 54.

For comparison purposes, a portion of the raw $\alpha B\alpha$ block copolymer was molded and tested similarly. The results of the tests are shown in Table 1.

TABLE 1

| Experiment No. | 1 | 2 | 3 | Control |
|---|---|---|---|---|
| $\alpha B\alpha$ content (p.b.w.) | 100 | 100 | 100 | 100 |
| Butyl content (p.b.w.) | 30 | 40 | 50 | — |
| Tensile strength (Kg.cm$^{-2}$) | 126 | 105 | 71 | 153 |
| Elongation at break (%) | 880 | 795 | 695 | 635 |
| 100% modulus (Kg.cm$^{-2}$) | 17 | 15 | 14 | 22 |
| 300% modulus (Kg. cm$^{-2}$) | 27 | 32 | 25 | 40 |
| Air permeability | 2.75×10$^{-8}$ | 2.45×10$^{-8}$ | 2.15×10$^{-8}$ | 4.06×10$^{-8}$ |
| Self-sealability | good | good | good | poor |
| Trouser tear (Kg.cm$^{-1}$) | 29 | 27 | 20 | 27 |
| Shore A-2 hardness | 55 | 54 | 54 | 60 |

The tests of tensile strength, elongation, modulus, trouser tear strength and Shore A-2 hardness are all well known in the art, and were carried out in the normal way, at 25° C.

The air permeability was measured by measuring the volume of air (corrected to N.T.P.) which will pass through a sealing plug of the composition of area 1 square cm. and thickness 1 cm., under a differential pressure of 1 atmosphere, in unit time. In Table 1, the units of air permeability are c.c. per second per square cm. per cm. per $\Delta P = 1$ atmosphere.

The self-sealability of the composition was estimated by means of the following empirical test. A molding of the composition of about 4mm thickness was pierced with a gauge 15 syringe needle, the needle withdrawn, and after a lapse of about 15 seconds the molding was subjected to a hydrostatic pressure of about 0.25 p.s.i. This was done by supporting a 7-inch column of water on the pierced plug. If the leakage of the water occurred through the plug, its self-sealability was ranked as poor. If no leakage occurred over a considerable period of time, its self-sealability was ranked as good.

In addition to the above tests, moldings from the blended compositions were immersed in boiling water to simulate sterilization conditions to which pharmaceutical enclosures are subjected. No distortion was observed with any of these moldings.

EXAMPLE 2

In this example, three further blends of $\alpha B\alpha$ block copolymer of Example 1 and butyl rubber were prepared as in Example 1, using different proportions of ingredients, and the air permeability of samples molded from the blend measured in the same way. These results are given in Table 2.

TABLE 2

| Experiment No. | 4 | 5 | 6 |
|---|---|---|---|
| $\alpha B\alpha$ content (p.b.w.) | 100 | 100 | 100 |
| Butyl content (p.b.w.) | 20 | 60 | 80 |
| Air permeability | 2.97×10$^{-8}$ | 1.84×10$^{-8}$ | 1.30×10$^{-8}$ |

While the air impermeability is further increased with blends containing more than 50 parts by weight of butyl rubber, other desirable properties such as tensile strength and tear strength tend to deteriorate at these levels.

EXAMPLE 3

In this example, three component blends of $\alpha B\alpha$ block copolymers, butyl rubber and polystyrene were prepared and tested in the manner previously described. Five different blends were prepared, using different proportions of ingredients. The formulations and results are given in Table 3. The comparable test results on the $\alpha B\alpha$ block copolymer control from Table 1 are repeated, for ease of comparison.

TABLE 3

| Experiment No. | 7 | 8 | 9 | 10 | 11 | Control |
|---|---|---|---|---|---|---|
| $\alpha B\alpha$ content (p.b.w.) | 100 | 100 | 100 | 100 | 100 | 100 |

| | | | | | | |
|---|---|---|---|---|---|---|
| Butyl content (p.b.w.) | 10 | 20 | 20 | 40 | 60 | — |
| Polystyrene content (p.b.w.) | 20 | 20 | 10 | 10 | 10 | — |
| Tensile strength (Kg.cm$^{-2}$) | 167 | 105 | 106 | 75 | 48 | 153 |
| Elongation at break (%) | 660 | 485 | 575 | 515 | 280 | 635 |
| 100% Modulus (Kg.cm$^{-2}$) | 44 | 34 | 43 | 38 | 34 | 22 |
| 300% Modulus (Kg.cm$^{-2}$) | 87 | 64 | 63 | 54 | — | 40 |
| Trouser tear (Kg.cm$^{-1}$) | 45 | 38 | 53 | 39 | 32 | 27 |
| Shore A-2 hardness | 66 | 62.5 | 60 | 50 | 42 | 60 |

The improved tear strength of the above three-component compositions along with substantial maintenance of the other important physical properties, as compared with the block copolymer control, is noteworthy. Such thermoplastic, elastomeric moldable compositions are suitable as a base polymer for preparation of shoe soles, especially the compositions of experiments 8 and 9 detailed above.

Example 4

In this example, blends of an αBα block copolymer and butyl rubber, containing a higher proportion of butyl rubber, were prepared and tested in the manner previously prepared. The αBα block copolymer in these blends had an alphamethylstyrene content of 30 weight per cent, and an estimated overall molecular weight of about 75,000. Three different blends were prepared, using different proportions of ingredients. The formulations and the results of physical tests carried out, are reported in Table 4. The αBα block copolymer only was also tested and the results recorded in Table 4.

TABLE 4

| Experiment No. | 12 | 13 | 14 | 15(control) |
|---|---|---|---|---|
| αBα content (p.b.w.) | 100 | 100 | 100 | 100 |
| Butyl content (p.b.w.) | 100 | 125 | 150 | — |
| Tensile strength (Kg.cm$^{-2}$) | 64 | 61 | 40 | 216 |
| Elongation at break (%) | 925 | 100 | 980 | 865 |
| 100% Modulus (Kg.cm$^{-2}$) | 8 | 6 | 6 | 15 |
| 300% Modulus (Kg.cm$^{-2}$) | 11 | 10 | 8 | 25 |
| Trouser tear strength (Kg.cm$^{-1}$) | 10.0 | 9.0 | 8.0 | 24.0 |
| Shore A-2 hardness | 29.0 | 26.0 | 24.0 | 52.0 |

These blends display an interesting and unusual combination of elasticity, low hardness and reasonable strength, useful in molded soft rubber goods. In addition, these blends exhibit very good air impermeability, and placed in boiling water without showing distortion. In blends where a major proportion of butyl rubber is used, however, it is desirable that the block copolymer should have a tensile strength of at least 200 Kg/cm$^{-2}$.

What is claimed is:

1. A thermoplastic elastomeric composition of improved air impermeability comprising 100 parts by weight of a thermoplastic elastomeric block copolymer, wherein the thermoplastic terminal blocks are selected from polystyrene and polyalphamethylstyrene and the non-terminal elastomeric block is a polymer of a conjugated diolefinic hydrocarbon, and from about 5 to about 250 parts by weight of an isobutylene polymer selected from polyisobutylene and butyl rubber, said composition being free of curing agent.

2. The composition of claim 1 wherein the thermoplastic copolymer is polyalphamethylstyrene-polydiolefin-polyalphamethylstyrene block copolymer containing about 30–35 percent by weight of alphamethylstyrene.

3. The composition of claim 2 wherein the elastomeric polymer block is polybutadiene.

4. The composition of claim 2 wherein the isobutylene polymer is butyl rubber.

5. The composition of claim 1 which additionally comprises up to 50 parts by weight of a polymer of a monoalkenyl substituted aromatic hydrocarbon.

6. The composition of claim 5 wherein the additional polymer is polystyrene.

7. The composition of claim 6 comprising 100 parts by weight of a block copolymer of general form polyalphamethylstyrene-polybutadiene-polyalphamethylstyrene, from about 10 to about 60 parts by weight of butyl rubber, and from about 10 to about 50 parts by weight of polystyrene.

8. A polymeric composition of claim 2 wherein the isobutylene polymer is butyl rubber used in an amount of from about 30 to about 50 parts by weight per 100 parts of block.

9. A pharmaceutical enclosure molded from the uncured polymeric composition of claim 8.

10. The composition of claim 2, which comprises a major proportion of butyl rubber, and in which the block copolymer has a tensile strength of at least 200 Kg.cm$^{-2}$.

* * * * *